(12) United States Patent
Mutnury et al.

(10) Patent No.: US 10,595,396 B2
(45) Date of Patent: Mar. 17, 2020

(54) SYSTEM AND METHOD OF UTILIZING SERPENTINE REGIONS

(71) Applicant: Dell Products L.P., Round Rock, TX (US)

(72) Inventors: Bhyrav M. Mutnury, Austin, TX (US); Chun-Lin Liao, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/295,228

(22) Filed: Mar. 7, 2019

(65) Prior Publication Data

US 2019/0261505 A1 Aug. 22, 2019

Related U.S. Application Data

(62) Division of application No. 15/898,845, filed on Feb. 19, 2018, now Pat. No. 10,306,749.

(51) Int. Cl.
| | |
|---|---|
| *G01R 31/28* | (2006.01) |
| *H05K 1/02* | (2006.01) |
| *G06F 11/34* | (2006.01) |
| *G06F 11/36* | (2006.01) |
| *H05K 1/11* | (2006.01) |

(52) U.S. Cl.
CPC .......... *H05K 1/0245* (2013.01); *G01R 31/28* (2013.01); *G06F 11/348* (2013.01); *G06F 11/3648* (2013.01); *H05K 1/0228* (2013.01); *H05K 1/112* (2013.01); *H05K 1/025* (2013.01); *H05K 2201/09263* (2013.01); *H05K 2201/09281* (2013.01); *H05K 2201/09727* (2013.01); *H05K 2201/10053* (2013.01)

(58) Field of Classification Search
CPC ............... H05K 1/0245; H05K 1/0228; H05K 2201/10053; H05K 1/112; H05K 2201/09281; G06F 11/348; G06F 11/3648; H04B 3/50; H04L 25/02
USPC ........................................................ 174/255
See application file for complete search history.

(56) References Cited

U.S. PATENT DOCUMENTS

| | | | | |
|---|---|---|---|---|
| 9,024,196 | B2 * | 5/2015 | Yoneya ................. | H05K 1/0248 174/250 |
| 9,118,097 | B2 * | 8/2015 | Shiue ................... | H05K 1/0245 |
| 9,118,516 | B1 * | 8/2015 | Ao ....................... | H04L 25/0278 |
| 9,155,202 | B2 * | 10/2015 | Wang .................. | H01L 23/5328 |
| 9,338,882 | B2 | 5/2016 | Xiao | |
| 2011/0132648 | A1 * | 6/2011 | Mutnury ............. | H05K 1/0245 174/260 |

(Continued)

*Primary Examiner* — Timothy J Thompson
*Assistant Examiner* — Michael F McAllister
(74) *Attorney, Agent, or Firm* — Baker Botts L.L.P.

(57) ABSTRACT

In one or more embodiments, a circuit board may include a trace pair and a serpentine region of the trace pair, which may include: a first subregion in which the first trace includes a first portion that has a third width and a first length and in which the second trace includes a second portion, at least substantially parallel to the first portion, that has a fourth width, greater than the second width, and a second length; and a second subregion, adjacent to the first subregion, in which the first trace includes a third portion that has the third width and a third length and in which the second trace includes a third portion that has the fourth width and a third length, different from the second length.

1 Claim, 10 Drawing Sheets

(56) References Cited

U.S. PATENT DOCUMENTS

2011/0203834 A1\* 8/2011 Yoneya ................ H05K 1/0248
174/250
2015/0173256 A1\* 6/2015 Ao ....................... G06F 17/5077
174/107

\* cited by examiner

SYSTEM AND METHOD OF UTILIZING SERPENTINE REGIONS

BACKGROUND

Field of the Disclosure

This disclosure relates generally to traces of circuit boards and more particularly to traces of differential signals.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly or efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switches, servers, and/or other computing devices typically include circuit boards with communication traces that couple subsystems to provide transmission of information between the subsystems. For example, a trace pair may be provided between a first subsystem and a second subsystem in order allow those subsystems to transmit and receive information. In some situations, the trace pair may couple to the first subsystem and/or the second subsystem at couplers such as, for example, pins included in a pin field (e.g., a Ball Grid Array (BGA) pin field.) The routing of trace pairs through such connectors can cause issues with the differential trace pair due to the coupler arrangement, the placement of the differential trace pair, the angle of routing, and/or other trace pair routing characteristics. One of the common issues encountered in routing trace pairs in these and similar situations can occur when that routing results in one of the traces of the trace pair being longer than another. This mismatch of trace length may cause common mode noise where a signal sent from the transmitter subsystem on the shorter trace in the trace pair arrives at the receiver subsystem before the signal that was sent from the first subsystem on the longer trace in the trace pair. This issue is amplified as signal speeds increase beyond 25 Gbps (gigabits per second), as resulting common mode noise cannot be ignored, and issues associated with increased insertion loss and return loss are introduced.

Conventional systems attempt to remedy this issue by flipping the polarity at the second subsystem end of the trace pair such that the shorter trace leaving the first subsystem end of the differential trace pair becomes the longer trace entering the second subsystem end of the differential trace pair. However, such solutions result in common mode noise throughout the routing of the differential trace pair, and are not possible on all system designs. Another conventional method for compensating for such differing trace length is to provide a serpentine trace region in the shorter trace that increases the length of the shorter trace to match that of the longer trace. The serpentine region length matching of the traces in the trace pair solves the common mode noise issue discussed above, but as signal speeds are increased to over 25 Gbps (e.g., 32 Gbps to 50/56 Gbps and beyond), the serpentine region length matching approach produces signal integrity issues. For example, when the shorter trace moves away from the longer trace in the serpentine region of the trace pair, an increase in impedance can occur (e.g., increases in impedance of 7-15 ohms have been observed depending on the stack-up cross-section and the material of the circuit board), resulting in high signal speed reflections and losses.

SUMMARY

In one or more embodiments, a circuit board may include a first board structure member, a second board structure member, a third board structure member, a fourth board structure member, and a trace pair, among others. For example, the trace pair may include a first trace that extends between the first board structure member and the third board structure member and that has a first width, a second trace that extends between the second board structure member and the fourth board structure member and that has a second width, and a serpentine region of the trace pair, among others. In one or more embodiments, the serpentine region may include a first subregion in which the first trace includes a first portion that has a third width and a first length and in which the second trace includes a second portion, at least substantially parallel to the first portion, that has a fourth width, greater than the second width, and a second length; and a second subregion, adjacent to the first subregion, in which the first trace includes a third portion that has the third width and a third length and in which the second trace includes a third portion that has the fourth width and a third length, different from the second length. In one example, the second width may be the first width. In another example, the fourth width may be the third width. In one or more embodiments, the first subregion may include a first transition portion that extends between the second trace to the first portion. In one or more embodiments, an impedance of the first subregion may be different from an impedance of the second subregion.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
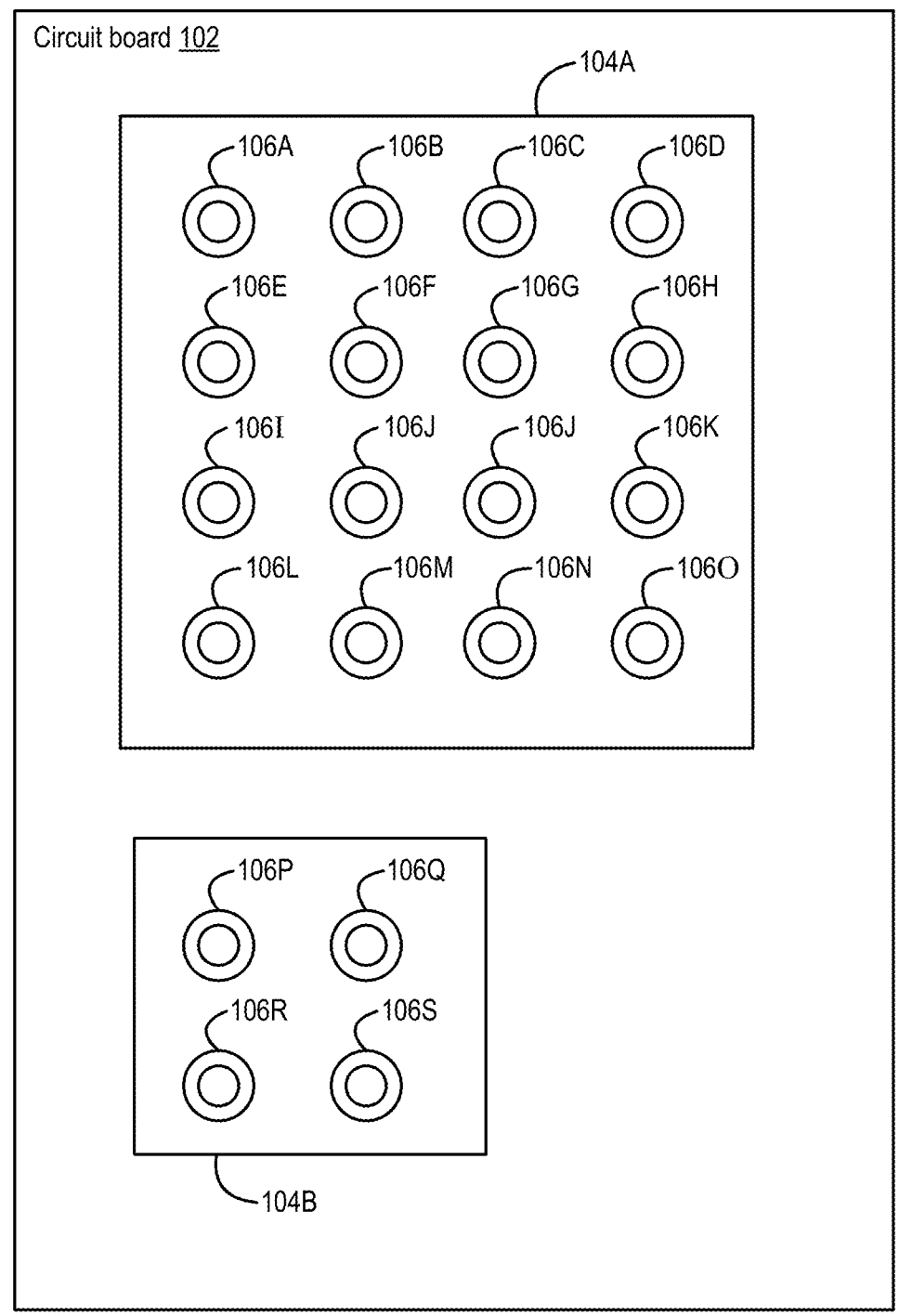
FIG. 1 illustrates an example of a board structure, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, as a signal (e.g., a digital signal) travels from a transmitter source to a receiver, the signal may suffer one or more impairments. In one example, one or more of the transmitter source, a printed circuit board (PCB) trace, a connector, and a cable may introduce interference, which may degrade the digital signal in amplitude and/or timing. In another example, one or more internal sources may impair the signal. For instance, as signals on adjacent integrated circuit (IC) pairs toggle or adjacent pairs of PCB traces toggle, crosstalk may occur, which may impair one or more of the signals. In one or more embodiments, one or more impairments may be acceptable at one or more signal speeds. For example, the one or more signal speeds where one or more impairments may be acceptable may include one or more signal speeds below twenty-five gigabits per second (Gbps). In one or more embodiments, PCB traces for differential signals from an IC or a physical connector may not allow and/or permit uniform lengths of the PCB traces. For example, a first PCB trace of PCB traces for differential signals from an IC or a physical connector may be longer or shorter than a second PCB trace of the PCB traces for differential signals. In one or more embodiments, a shorter PCB trace of a pair of PCB traces for differential signals may be lengthened via a serpentine trace. For example, a single length of the pair of PCB traces for differential signals may be achieved and/or implemented via the serpentine trace. In one or more embodiments, utilizing a serpentine trace with a pair of PCB traces for differential signals may introduce one or more impedance mismatches. For example, the one or more impedance mismatches may be introduced via a distance between the PCB traces and/or a repetitive and/or periodicity of the serpentine trace.

Turning now to FIG. 1, an example of a board structure is illustrated, according to one or more embodiments. As shown, a board structure 100 may be or include a circuit board 102. In one or more embodiments, circuit board 102 may couple two or more devices to one-another. For example, circuit board 102 may one or more traces that may couple two or more devices to one-another. In one instance, circuit board 102 may couple a first device to a second device via one or more traces. In another instance, circuit board 102 may couple a first device to a connector, which may connect one or more of circuit board 102 and the first device to another circuit board and/or another device (e.g., another device of the other circuit board).

In one or more embodiments, circuit board 102 may include board structure members 106. In one example, board structure members 106 may be or include coupling pads. In one instance, coupling pads may be coupled a device (e.g., a surface mount device (SMD), a subsystem, a semiconductor, a connector, etc.) to circuit board 102. In another instance, coupling pads may be soldered a device. In another example, board structure members 106 may be arrange in any order and/or at any positions of circuit board 102. In one or more embodiments, board structure members 106 may be arranged in one or more arrays. In one example, first board structure members 106 may be arranged in a first array to accommodate a first device. For instance, the first device may include a ball grid array (BGA) coupling arrangement, and the first array may accommodate the BGA coupling arrangement of the first device. In another example, second board structure members 106 may be arranged in a second array to accommodate a second device. For instance, the second device may include a QFN (quad flat no-lead) coupling arrangement, and the second array may accommodate the QFN coupling arrangement of the second device.

In one or more embodiments, circuit board 102 may include one or more board structure areas. As illustrated, circuit board 102 may include board structure areas 104A and 104B. For example one or more devices may be coupled to board structure members 106 of a board structure area 104. In one instance, a first device may be coupled to board structure members 106A-106O of board structure area 104A. In another instance, a second device may be coupled to board structure members 106P-106S of board structure area 104B.

Figure 2:
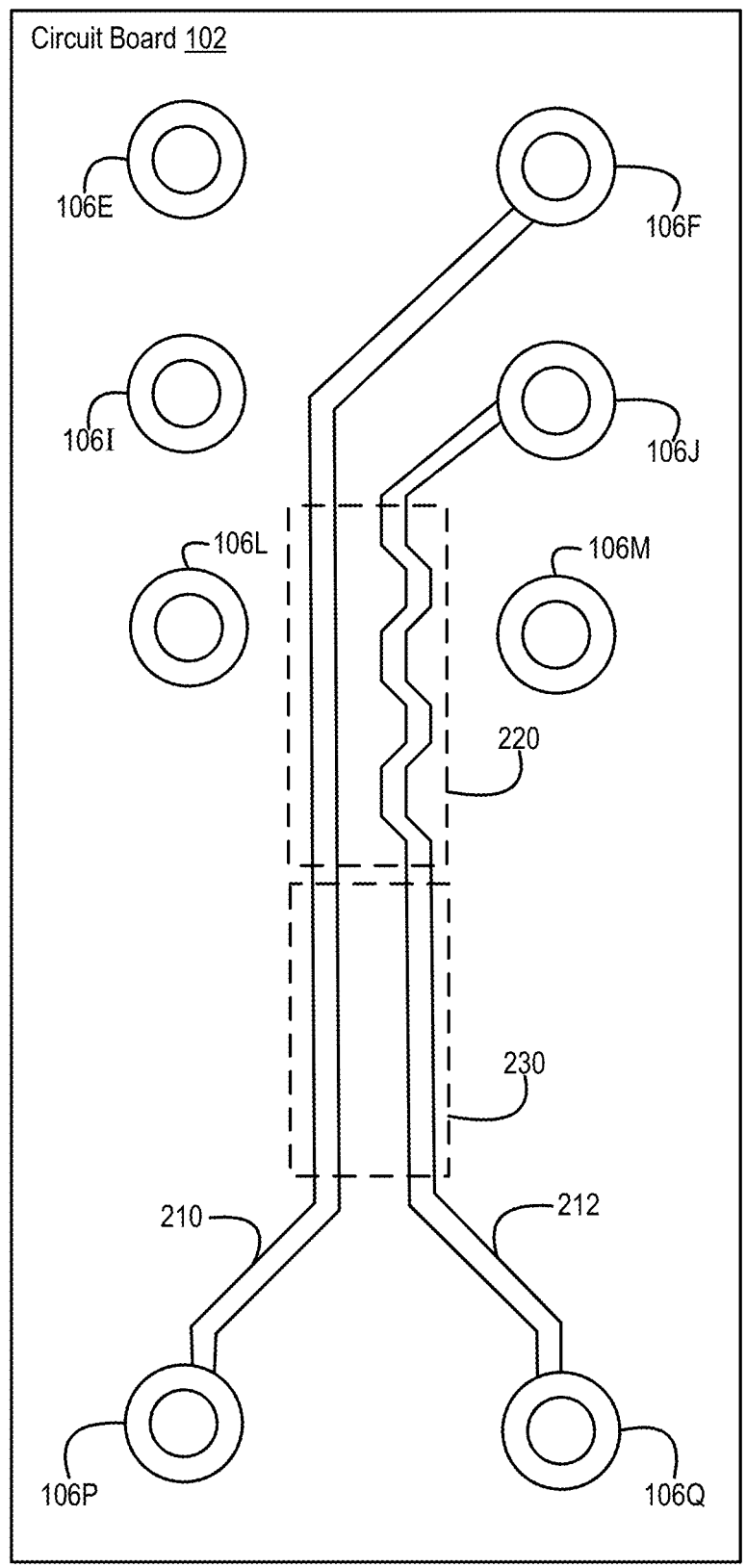
FIG. 2 illustrates an example of a circuit board that includes traces, according to one or more embodiments.

Turning now to FIG. 2, an example of a circuit board that includes traces is illustrated, according to one or more embodiments. As shown, circuit board 102 may include traces 210 and 212. In one or more embodiments, traces may be defined, created, formed, etched, and/or otherwise provided by etching and/or masking techniques such as photoengraving, PCB milling, and/or silk-screen printing, among others. As illustrated, trace 210 may couple board structure members 106F and 106P, and trace 212 may couple board structure members 106J and 106Q. In one or more embodiments, a distance between board structure members 106F and 106P may be greater than a distance between board structure members 106J and 106Q.

In one or more embodiments, traces 210 and 212 may form and/or may be a trace pair. For example, the trace pair may be or include a differential trace pair. In one or more embodiments, traces 210 and 212 may be in a layer of circuit board 102. For example, circuit board 102 may include multiple layers. For instance, traces 210 and 212 may be in a first layer, a second layer, a third layer, a fourth layer, etc. of circuit board 102. For instance, traces 210 and 212 may be coupled to one or more pads and/or one or more vias, among others. As shown, trace 212 may include a serpentine region 220. In one or more embodiments, serpentine region 220 may be utilized in equaling and/or balancing lengths of traces 210 and 212. In one or more embodiments, a trace may include multiple serpentine regions. As illustrated, the trace pair may include a region 230 where traces 210 and 212 are parallel or are substantially parallel. For example, substantially parallel may mean that traces 210 and 212 are parallel within manufacturing tolerances, according to some metric.

Figure 3A:
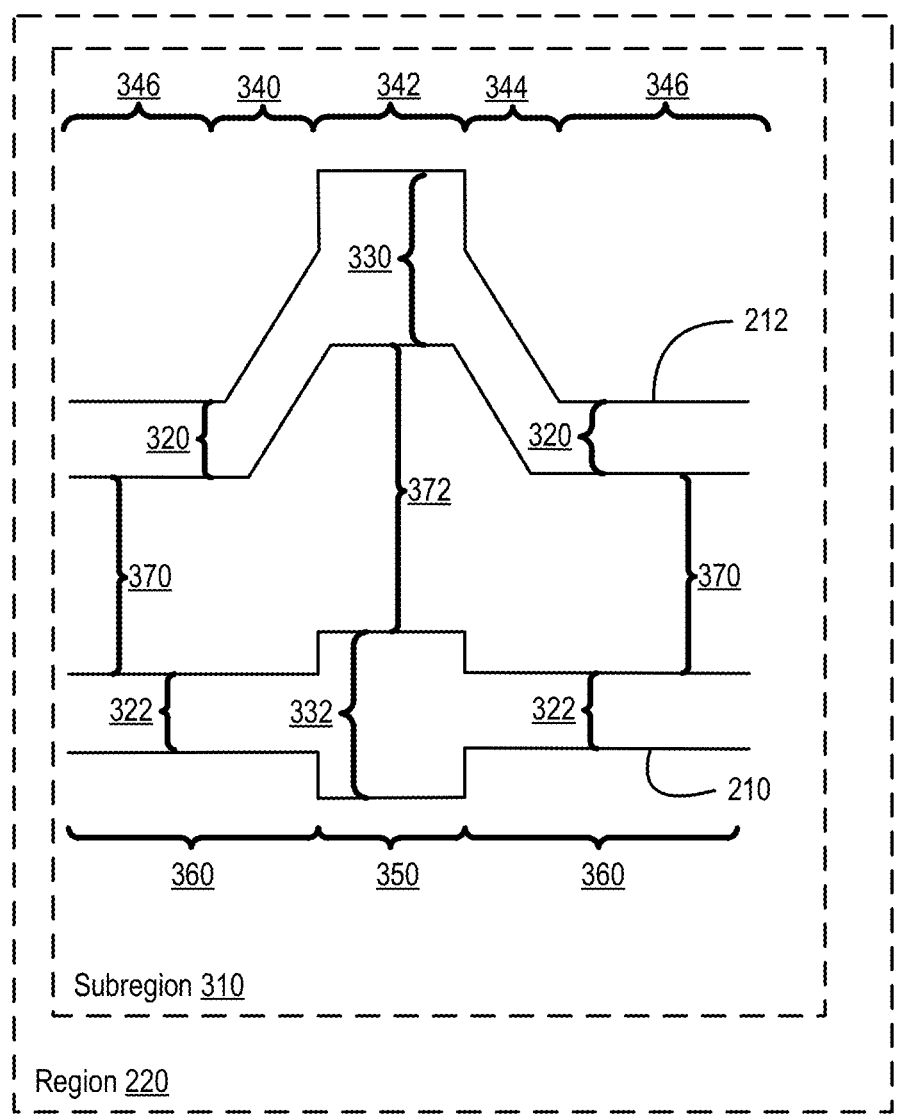
FIG. 3A illustrates an example of a subregion of a serpentine region, according to one or more embodiments.

Turning now to FIG. 3A, an example of a subregion of a serpentine region is illustrated, according to one or more embodiments. As shown, a subregion 310 includes a portion of serpentine region 220. As illustrated, subregion 310 may include a trace portion 346, a trace transition region 340, a trace portion 342, a trace transition region 344, and another trace portion 346 of trace 212. As shown, subregion 310 may include a trace portion 360, a trace portion 350, and another trace portion 360 of trace 210.

In one or more embodiments, a length of trace portion 342 and a length of trace portion 350 may be equal. In one or more embodiments, a length of trace portion 342 and a length of trace portion 350 may be substantially equal. In one example, substantially equal may mean within one or more manufacturing tolerances. In another example, substantially equal may mean within one or more implementation tolerances. In one or more embodiments, a length of trace portion 342 and a length of trace portion 350 may be different. As illustrated, trace portion 342 may include a width 330 and trace portion 350 may include a width 332. In one example, width 330 may be greater than a width 320 of trace portion 346. In another example, width 332 may be greater than a width 322 of trace portion 360. As shown, trace 210 may include a width 322, and trace 212 may include a width 320. In one or more embodiments, width 322 may be equal to width 320, width 322 may be substantially equal to width 320 (e.g., within manufacturing tolerances, implementation tolerances, etc.), width 322 may be greater than width 320, or width 322 may be less than width 320. In one or more embodiments, traces 210 and 212 may be a distance 370 apart. In one or more embodiments, trace portions 342 and 350 may be at a distance 372 apart. In one or more embodiments, distance 370 may be equal to distance 372, distance 370 may be substantially equal to distance 372 (e.g., within manufacturing tolerances, implementation tolerances, etc.), distance 372 may be less than distance 370, or distance 372 may be greater than distance 370.

Figure 3C:
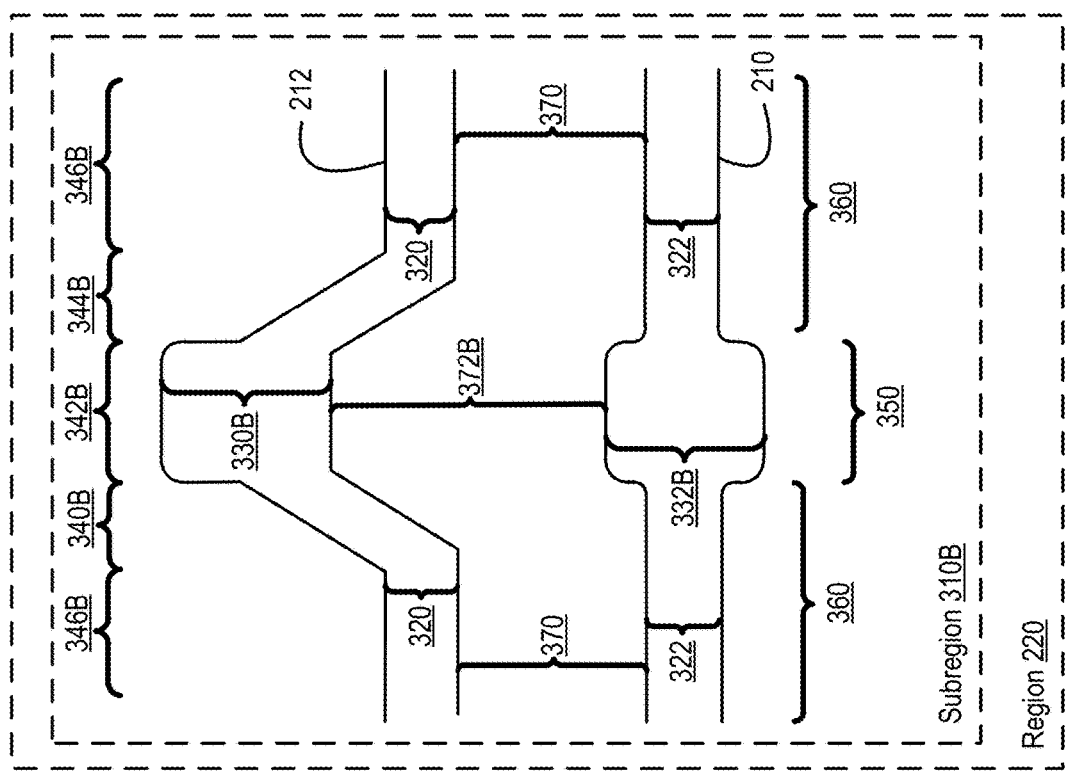
FIGS. 3B and 3C illustrate examples of one or more angles of one or more respective portions of a serpentine regions that are smoothed by a curve, according to one or more embodiments.
Figure 3B:
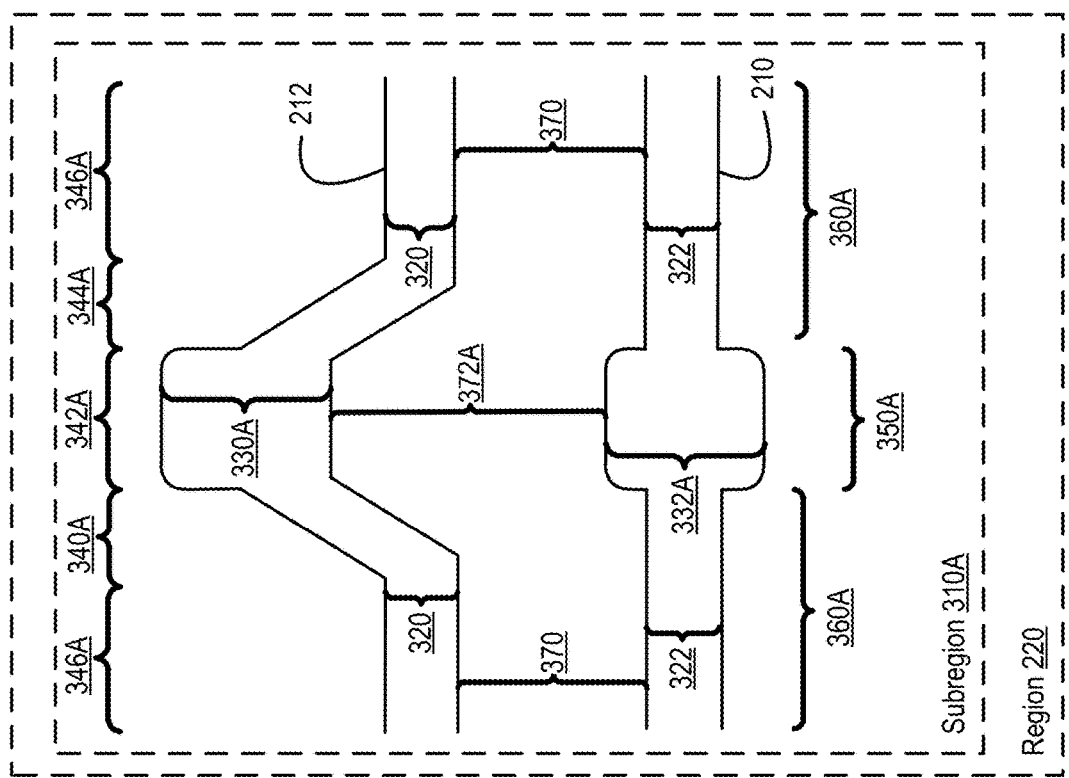

In one or more embodiments, a measure of width 330 and a measure of width 332 may be equal. In one or more embodiments, a measure of width 330 and a measure of width 332 may be substantially equal. In one example, substantially equal may mean within manufacturing tolerances, according to one or more metrics. In another example, substantially equal may mean within implementation tolerances, according to one or more metrics. In one or more embodiments, one or more angles of one or more respective portions may be smoothed. For example, one or more angles of one or more respective portions may be smoothed by a curve. For instance, one or more angles of one or more respective portions may be smoothed by a curve, as illustrated in FIGS. 3B and 3C.

In one or more embodiments, a subregion 310 may include electromagnetic characteristics that are associated with one or more measurements of trace portion 342, width 330, trace portion 350, and/or width 332, among others. For example, an electromagnetic characteristic may include an impedance that is associated with one or more measurements of trace portion 342, width 330, trace portion 350, and/or width 332, among others. In one instance, subregion 310 may be associated with an impedance, such as $Z=R+jX$ (where $j=\sqrt{-1}$). In another instance, subregion 310 may be associated with an impedance, such as R. In one or more embodiments, an impedance of subregion 310 may vary with one or more frequencies. For example, the impedance of subregion 310 may be or include $Z(\omega)=R+jX(\omega)$.

Figure 3D:
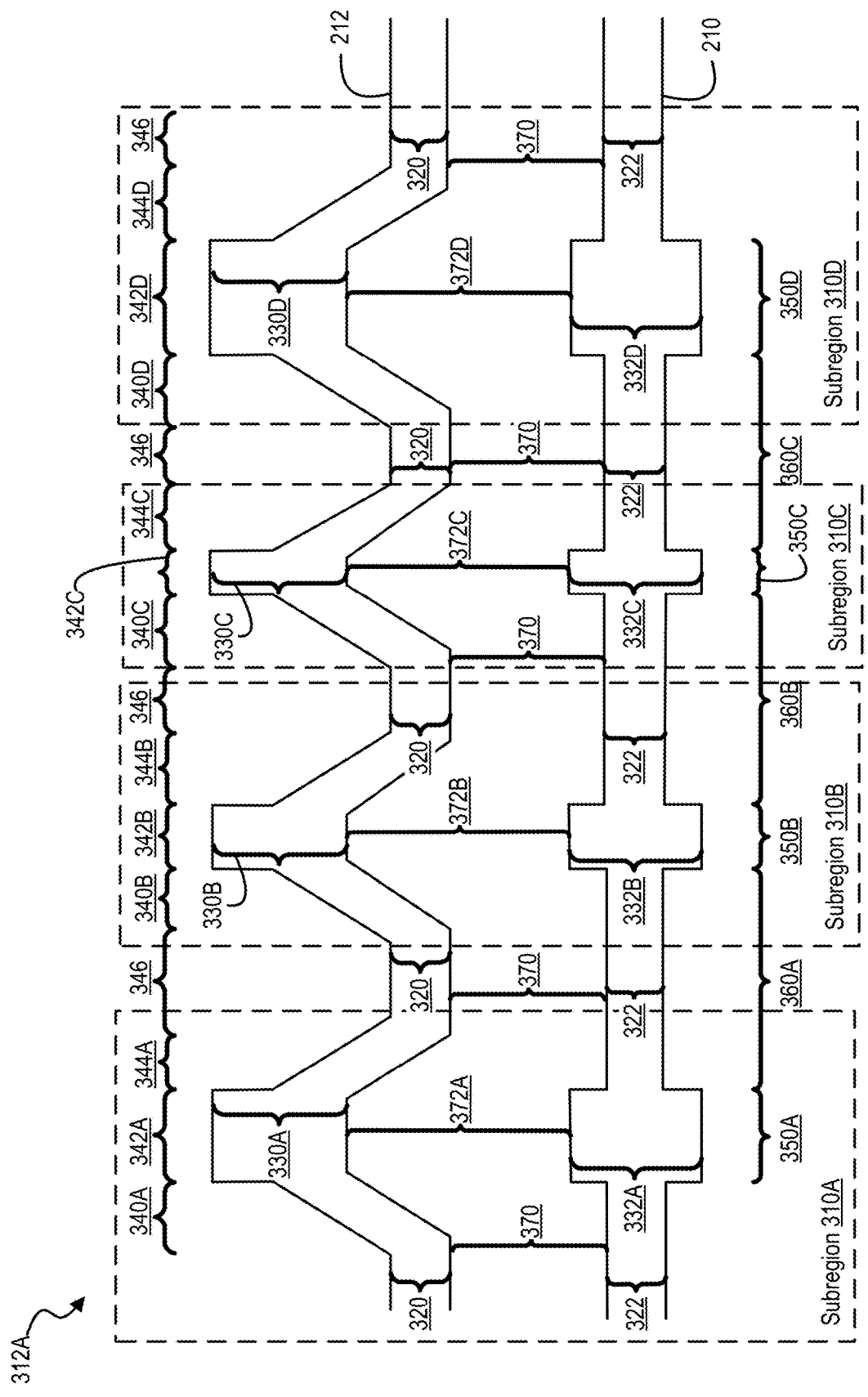
FIGS. 3D and 3E illustrate examples of arrangements of subregions of a serpentine region, according to one or more embodiments.
Figure 3E:
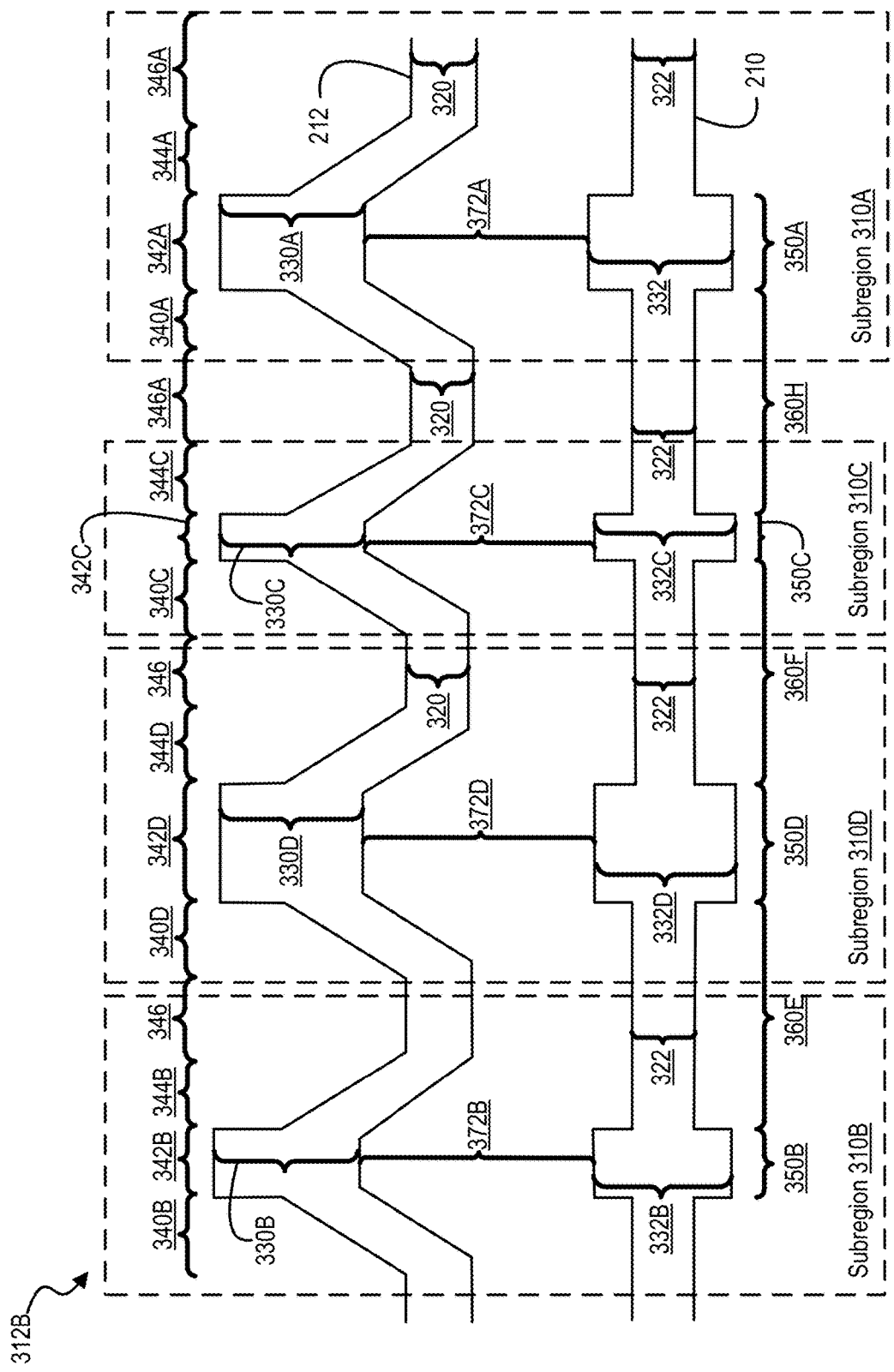

Turning now to FIGS. 3D and 3E, examples of arrangements of subregions of a serpentine region are illustrated, according to one or more embodiments. As shown in FIG. 3D, a subregion 312A may include multiple different subregions 310A-310D. As illustrated in FIG. 3E, a subregion 312B may include multiple different subregions 310B, 310D, 310C, and 310A. In one or more embodiments, each of the different subregions may have a different impedance from another subregion of the different subregions. In one example, subregion 310A may have a different impedance from each of subregions 310B-310D. In another example, subregion 310B may have a different impedance from each of subregions 310A, 310C, and 310D.

In one or more embodiments, multiple subregions 310 may include respective different lengths of trace portions 342. For example, a series of subregions 310 may include respective different lengths of trace portion 342. In one instance, subregion 310A may include a length of trace portion 342A that is different from any of lengths of respective trace portions 342B-342D. In a second instance, subregion 310B may include a length of trace portion 342B that is different from any of lengths of respective trace portions 342A, 342C, and 342D. In a third instance, subregion 310C may include a length of trace portion 342C that is different from any of lengths of respective trace portions 342A, 342B, and 342D. In another instance, subregion 310D may include a length of trace portion 342D that is different from any of lengths of respective trace portions 342A-342C.

In one or more embodiments, an impedance of subregion 310 may be based at least on a length of trace portion 342. For example, an impedance of subregion 310 may be proportional to a length of trace portion 342. In one or more embodiments, lengths of trace portions 342 of a series of subregions 310 may be random. For example, each length of trace portion 342 of subregion 310 may be unique to a series of subregions 310. In one or more embodiments, lengths of trace portions 342 of a series of subregions 310 may be pseudorandom. For example, each length of trace portion 342 of subregion 310 may be unique to a series of subregions 310.

Figure 4A:
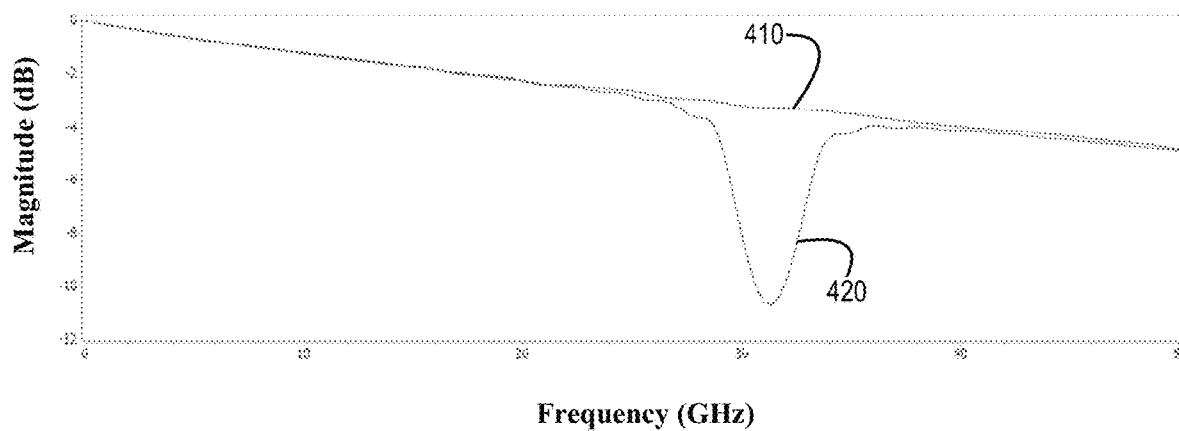
FIG. 4A illustrates example data plots, where one or more insertion losses are mitigated, according to one or more embodiments.
Figure 4B:
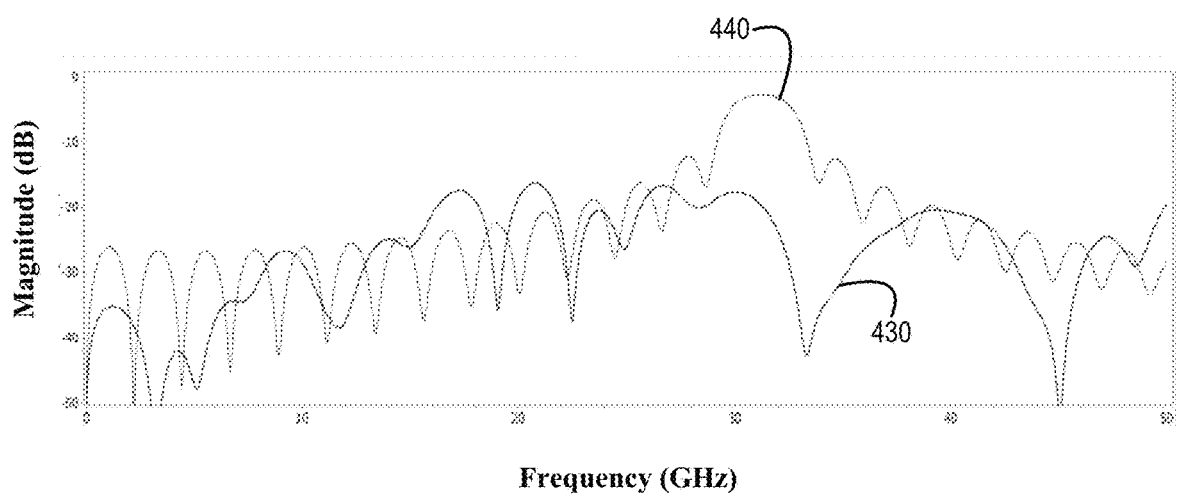
FIG. 4B illustrates example data plots, where one or more return losses are mitigated, according to one or more embodiments.
Figure 5:
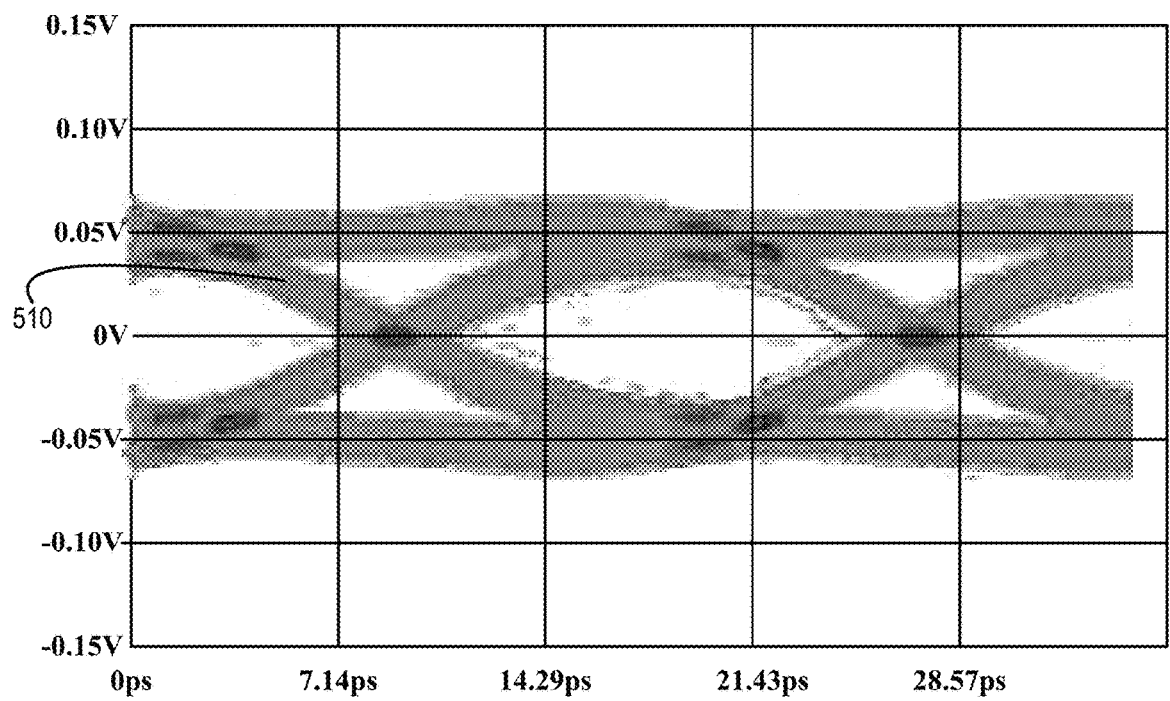
FIG. 5 illustrates eye diagram data plots of a trace pair with a serpentine region that does not utilize multiple different subregions and a plot of a trace pair with a serpentine region that utilizes multiple different subregions.
Figure 5:
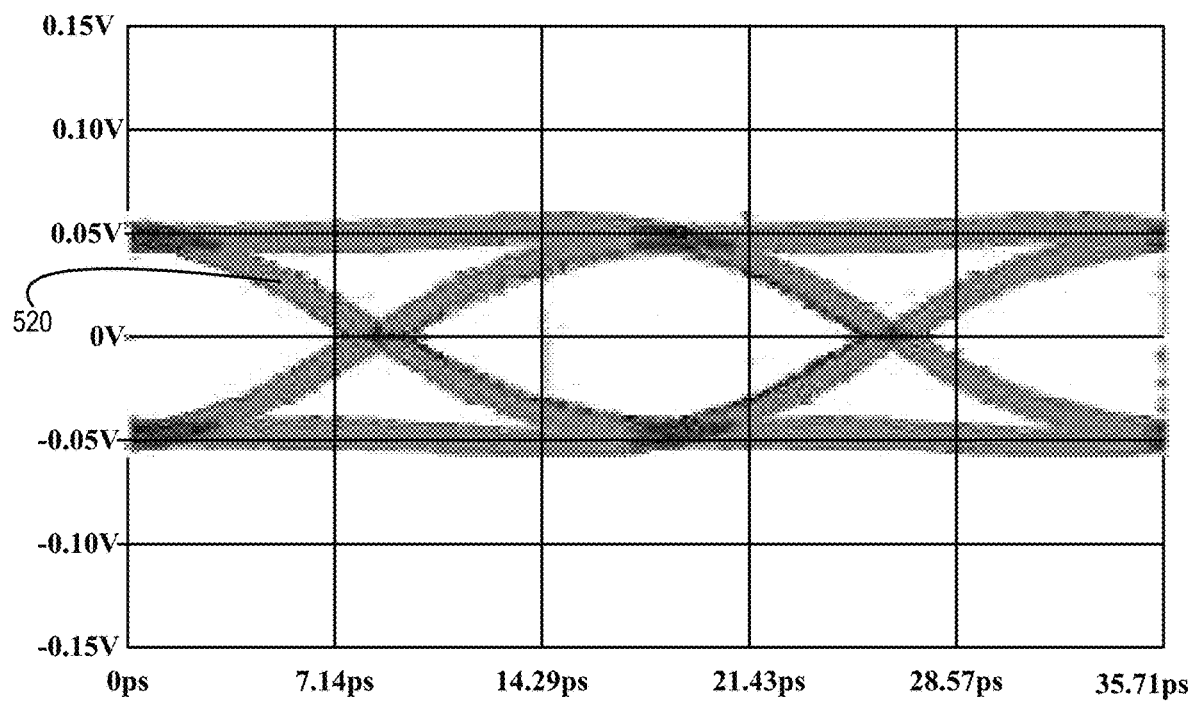

In one or more embodiments, utilizing multiple different subregions may mitigate or eliminate one or more resonant frequencies of a trace pair. In one example, one or more insertion losses may be mitigated, as illustrated in FIG. 4A. For instance, utilizing a trace pair with a serpentine region that includes multiple different subregions, such as those shown in FIGS. 3D and 3E, an insertion loss plot 410 illustrates (in FIG. 4A) mitigated insertion loss compared with an insertion loss plot 420 that does not utilize multiple different subregions. In a second example, one or more return losses may be mitigated, as illustrated in FIG. 4B. For instance, utilizing a trace pair with a serpentine region that includes multiple different subregions, such as those shown in FIGS. 3D and 3E, a return loss plot 430 illustrates (in FIG. 4B) mitigated return loss compared with a return loss plot 440 of a trace pair with a serpentine region that does not utilize multiple different subregions. In another example, illustrated in FIG. 5, an diagram 510 shows a plot of a trace pair with a serpentine region that does not utilize multiple different subregions, and an eye diagram 520 shows a plot of a trace pair with a serpentine region that utilizes multiple different subregions. For instance, eye diagram 520 is less distorted than eye diagram 510.

In one or more embodiments, a serpentine region that utilizes multiple different subregions may include one or more subregion arrangements. In one example, a subregion arrangement may include an arrangement that has no two same subregions that are adjacent (e.g., subregion 310B may not be adjacent to another subregion 310B). For instance, the subregion arrangement may include N factorial (e.g., N!) subregions for N different subregions. In another example, a subregion arrangement may include an arrangement that has no two consecutive different subregions that are adjacent (e.g., consecutive subregions 310B and 310D may not be adjacent to another consecutive subregions 310B and 310D). For instance, the subregion arrangement may include N–1 factorial (e.g., (N–1)!) subregions for N different subregions.

In one or more embodiments, a serpentine region that utilizes multiple different subregions may include one or more repeated subregion arrangements. In one example, a subregion that includes N factorial (e.g., N!) subregions for N different subregions may be repeated. In a second example, a subregion that includes N–1 factorial (e.g., (N–1)!) subregions for N different subregions may be repeated. In a third example, a subregion that includes subregions 310A-310D may be repeated. In a fourth example, a subregion that includes subregions 310B, 310D, 310C, and 310A may be repeated. In another example, a subregion that includes subregions 310A-310D, 310B, 310D, 310C, and 310A may be repeated. In one or more embodiments, utilizing different subregions, with respective different impedances, in a serpentine region may provide one or more advantageous results illustrated in FIGS. 4A, 4B, and/or 5.

Figure 6:
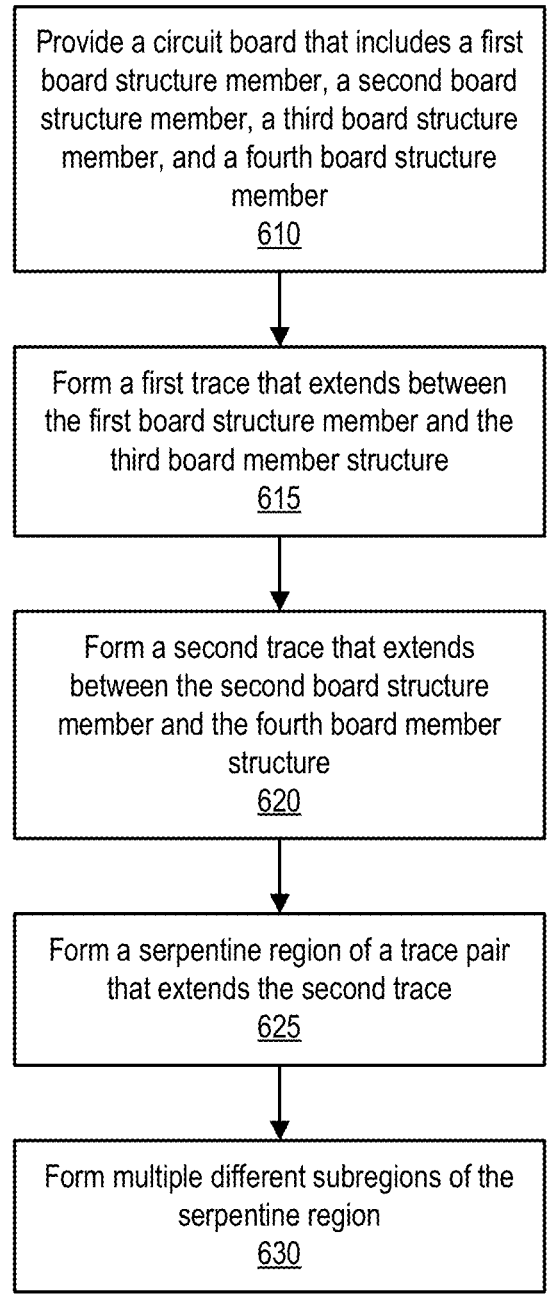
FIG. 6 illustrates a method of utilizing a serpentine region is illustrated, according to one or more embodiments.

Turning now to FIG. 6, a method of utilizing a serpentine region is illustrated, according to one or more embodiments. At 610, a circuit board that includes a first board structure member, a second board structure member, a third board structure member, and a fourth board structure member may be provided. In one example, the circuit board may be or include circuit board 102. For instance, the circuit board may be or include a printed circuit board, a flexible printed circuit board, and/or a multi-layer circuit board, among others. In another example, the first board structure member, the second board structure member, the third board structure member, and the fourth board structure member may respectively be or include board structure members 106P, 106Q, 106F, and 106J.

At 615, a first trace that extends between the first board member structure and the third board member structure may be formed. For example, trace 210 that extends between board structure members 106P and 106F may be formed. In one or more embodiments, the first trace may have a first width. For example, the first trace may have width 322. At 620, a second trace that extends between the second board member structure and the fourth board member structure may be formed. For example, trace 212 that extends between board structure members 106Q and 106J may be formed. In one or more embodiments, the second trace may have a second width. For example, the second trace may have width 320. For instance, the second width may be equal to or substantially equal to the first width.

At 625, a serpentine region of a trace pair that extends the second trace may be formed. In one example, the trace pair may include traces 210 and 212. In another example, serpentine region 220 that extends trace 212 may be formed. In one or more embodiments, serpentine region 220 that extends trace 212 may be formed such that lengths of traces 210 and 212 are equal or are substantially equal. At 630, multiple different subregions of the serpentine region may be formed. For example, multiple different subregions 310 may be formed. For instance, multiple different subregions 310A-310D may be formed. In one or more embodiments, a first subregion of the multiple different subregions may be different from a second subregion of the multiple different subregions. For example, the first subregion may be adjacent to the second subregion. In one or more embodiments, each subregion of the multiple different subregions may be different from another subregion of the multiple different subregions to which the subregion is adjacent. In one instance, subregion 310A may be adjacent to subregion 310B. In a second instance, subregion 310D may be adjacent to subregion 310B. In another instance, subregion 310D may be adjacent to subregion 310C. In one or more embodiments, forming multiple different subregions 310 may include arranging different subregions 310 in a random pattern or a pseudorandom pattern. In one example, a random pattern may include a random sequence of different subregions 310. In another example, a pseudorandom pattern may include a pseudorandom sequence of different subregions 310.

In one or more embodiments, a first subregion, of the multiple different subregions of the serpentine region, may include a first portion that has a third width and a first length and in which the second trace includes a second portion, at least substantially parallel to the first portion, that has a fourth width, greater than the second width, and a second length. In one example, the third width may be width 332A. In a second example, the first length may be length 350A. In another example, the fourth width may be width 330. For instance, the fourth width may be equal to or substantially equal to the third width.

In one or more embodiments, a second subregion, of the multiple different subregions of the serpentine region, in which the first trace may include a third portion that has the third width and a third length and in which the second trace includes a third portion that has the fourth width and a third length, different from the second length. In one example, the third width may be width 332B. In another example, the third length may be length 350B. In one or more embodiments, the second subregion may be adjacent to the first subregion.

In one or more embodiments, forming a subregion may include forming one or more transition portions. In one example, forming subregion 310A may include forming one or more of transition portions 340A and 344A. In one instance, a first transition portion (e.g., transition portion 340A) of subregion 310A may extend between the second trace and the first portion. In another instance, a second transition portion (e.g., transition portion 344A) of subregion 310A may extend between the second trace and the first portion. In another example, forming subregion 310B may include forming one or more of transition portions 340B and 344B. In one instance, a first transition portion (e.g., transition portion 340B) of subregion 310B may extend between the second trace and the first portion. In another instance, a second transition portion (e.g., transition portion 344B) of subregion 310B may extend between the second trace and the second portion.

Figure 7:
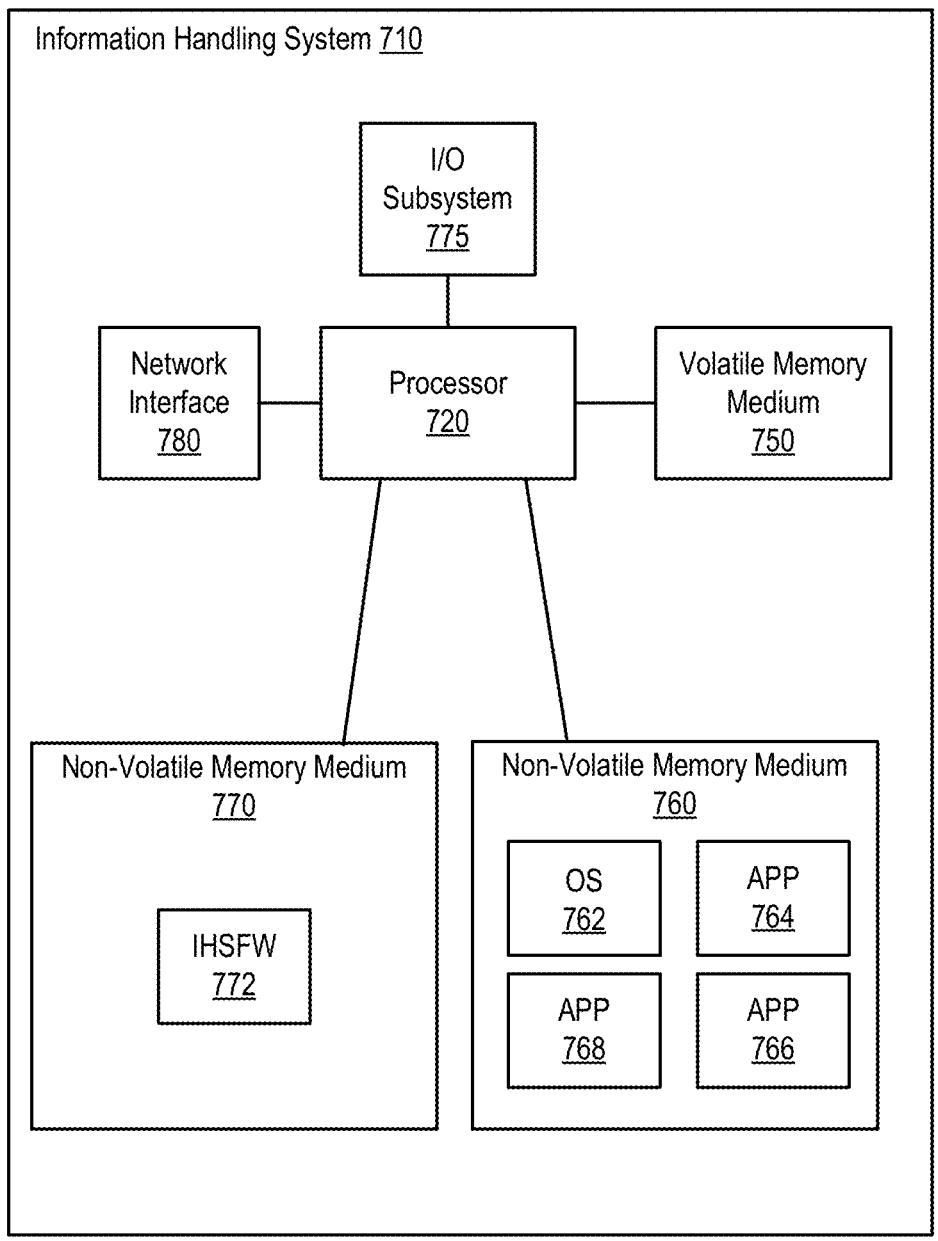
FIG. 7 illustrates an example of an information handling system, according to one or more embodiments.

Turning now to FIG. 7, an example of an information handling system is illustrated, according to one or more embodiments. An information handling system (IHS) 710 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 710 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 710 may include one or more storage devices, one or more communications ports for communicating with external devices as well as various input and output (I/O) devices, such as a keyboard, a mouse, and a video display, among others. In one or more embodiments, IHS 710 may include one or more buses operable to transmit communication between or among two or more hardware components. In one example, a bus of IHS 710 may include one or more of a memory bus, a peripheral bus, and a local bus, among others. In another example, a bus of IHS 710 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 710 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 710 may include a processor 720, a volatile memory medium 750, non-volatile memory media 760 and 770, an I/O subsystem 775, and a network interface 780. As illustrated, volatile memory medium 750, non-volatile memory media 760 and 770, I/O subsystem 775, and network interface 780 may be communicatively coupled to processor 720.

In one or more embodiments, one or more of volatile memory medium 750, non-volatile memory media 760 and 770, I/O subsystem 775, and network interface 780 may be communicatively coupled to processor 720 via one or more buses, one or more switches, and/or one or more root complexes, among others. In one example, one or more of volatile memory medium 750, non-volatile memory media 760 and 770, I/O subsystem 775, and network interface 780 may be communicatively coupled to processor 720 via one or more PCI-Express (PCIe) root complexes. In another example, one or more of an I/O subsystem 775 and a network interface 780 may be communicatively coupled to processor 720 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 750 may include volatile storage such as, for example, RAM, DRAM (dynamic RAM), EDO RAM (extended data out RAM), SRAM (static RAM), etc. One or more of non-volatile memory media 760 and 770 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 780 may be utilized in communicating with one or more networks and/or one or more other information handling systems. In one example, network interface 780 may enable IHS 710 to communicate via a network utilizing a suitable transmission protocol and/or standard. In a second example, network interface 780 may be coupled to a wired network. In a third example, network interface 780 may be coupled to an optical network. In another example, network interface 780 may be coupled to a wireless network.

In one or more embodiments, network interface 780 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 720 may execute processor instructions in implementing one or more systems, flowcharts, methods, and/or processes described herein. In one example, processor 720 may execute processor instructions from one or more of memory media 750-770 in implementing one or more systems, flowcharts, methods, and/or processes described herein. In another example, processor 720 may execute processor instructions via network interface 780 in implementing one or more systems, flowcharts, methods, and/or processes described herein.

In one or more embodiments, processor 720 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 720 may interpret and/or execute program instructions and/or process data stored locally (e.g., via memory media 750-770 and/or another component of IHS 710). In another example, processor 720 may interpret and/or execute program instructions and/or process data stored remotely (e.g., via a network storage resource).

In one or more embodiments, I/O subsystem 775 may represent a variety of communication interfaces, graphics interfaces, video interfaces, user input interfaces, and/or peripheral interfaces, among others. For example, I/O subsystem 775 may include one or more of a touch panel and a display adapter, among others. For instance, a touch panel may include circuitry that enables touch functionality in conjunction with a display that is driven by a display adapter.

As shown, non-volatile memory medium 760 may include an operating system (OS) 762, and applications (APPs) 764-768. In one or more embodiments, one or more of OS 762 and APPs 764-768 may include processor instructions executable by processor 720. In one example, processor 720 may execute processor instructions of one or more of OS 762 and APPs 764-768 via non-volatile memory medium 760. In another example, one or more portions of the processor instructions of the one or more of OS 762 and APPs 764-768 may be transferred to volatile memory medium 750, and processor 720 may execute the one or more portions of the processor instructions of the one or more of OS 762 and APPs 764-768 via volatile memory medium 750.

As illustrated, non-volatile memory medium 770 may include information handling system firmware (IHSFW) 772. In one or more embodiments, IHSFW 772 may include processor instructions executable by processor 720. For example, IHSFW 772 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 720 may execute processor instructions of IHSFW 772 via non-volatile memory medium 770. In another instance, one or more portions of the processor instructions of IHSFW 772 may be transferred to volatile memory medium 750, and processor 720 may execute the one or more portions of the processor instructions of IHSFW 772 via volatile memory medium 750.

In one or more embodiments, processor 720 and one or more components of IHS 710 may be included in a system-on-chip (SoC). For example, the SoC may include processor 720 and a platform controller hub (not specifically illustrated).

In one or more embodiments, IHS 710 may include one or more board structures, among others. For example, IHS 710 may include one or more board structures 100, not specifically illustrated, among others. For instance, IHS 710 may include one or more circuit boards 102, not specifically illustrated, among others.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor;
a memory that is coupled to the at least one processor and that is configured to store instructions executable by the at least one processor; and
a circuit board that includes:
  a first board structure member;
  a second board structure member;
  a third board structure member;
  a fourth board structure member; and
  a trace pair, that includes:
    a first trace that extends between the first board structure member and the third board structure member and that has a first width;
    a second trace that extends between the second board structure member and the fourth board structure member and that has a second width; and
    a serpentine region of the trace pair that includes:
      a first subregion in which the first trace includes a first portion that has a third width and a first length and in which the second trace includes a second portion, at least substantially parallel to the first portion, that has a fourth width, greater than the second width, and a second length; and a second subregion, adjacent to the first subregion, in which the first trace includes a third portion that has the third width and a third length and in which the second trace includes a third portion that has the fourth width and a third length, different from the second length.

\* \* \* \* \*